Feb. 17, 1948. R. H. VARIAN 2,435,988
AIRCRAFT LANDING SYSTEM
Filed Jan. 29, 1944 3 Sheets-Sheet 2

INVENTOR
RUSSELL H. VARIAN
BY
his ATTORNEY.

Feb. 17, 1948.  R. H. VARIAN  2,435,988
AIRCRAFT LANDING SYSTEM
Filed Jan. 29, 1944  3 Sheets—Sheet 3

INVENTOR
RUSSELL H. VARIAN
BY
ATTORNEY

Patented Feb. 17, 1948

2,435,988

UNITED STATES PATENT OFFICE 2,435,988

AIRCRAFT LANDING SYSTEM

Russell H. Varian, Garden City, N. Y., assignor to The Sperry Corporation, a corporation of Delaware Application January 29, 1944, Serial No. 520,207

39 Claims. (Cl. 250—11)

This invention relates to radio landing systems and particularly concerns transmitting systems for projecting radio beams to form a landing path along the intersection of the radio beams.

Radio landing systems of this type have heretofore required one or more antennas or radiators positioned adjacent a runway, or at one end thereof in a manner to form a path for landing planes on a particular runway. These radiators usually extend several feet above the ground and must be arranged so they do not obstruct the landing path.

As the use of aircraft has progressed and the number of planes landing at particular airports has increased, it has become necessary to provide parallel runways arranged so two or more planes may approach the landing field at the same time and land on separate runways. To provide for simultaneously landing several aircraft at the same landing field, it is necessary to have apparatus for defining separate radio landing paths for each of the several parallel runways. As the number of runways is increased, the radiators must be arranged so they do not obstruct any of the parallel landing paths. This may be accomplished by moving the antennas further away from their selected runways, but regardless of the distance to which they are removed, they will remain obstructions within the very much enlarged area for parallel landing on adjacent runways. Furthermore, parallel landings must be possible from all directions so antennas surrounding a landing area form hazards that endanger landing craft.

The major object of the present invention is to provide a landing path formed by radio beams from radiators arranged substantially flush with the ground so they do not form obstructions in any direction.

Another object of the present invention is to provide a plurality of parallel landing paths for a plurality of parallel runways so planes may follow the individual landing paths to land on the various runways simultaneously.

A further object of the present invention is to provide a landing path formed by the intersection of a pair of conically-shaped beams of electromagnetic energy.

A further object of the present invention is to provide a landing path formed by radio beams from cone-fire radiating wave guides arranged substantially flush with the surface of the landing area.

A further object of the present invention is to provide a landing path defined by the intersection of two conically-shaped equi-signal surfaces, each of which is formed between a pair of conically-shaped radio beams emitted from cone-fire radiating systems.

A still further object of the invention is to provide an equi-signal surface between two conically-shaped radio beams from a pair of radiating wave guides connected to the same transmitter, the wave guides being constructed to provide different phase velocities for energy supplied from the transmitter.

Other objects and advantages of the invention will become apparent from the following specification taken in connection with the accompanying drawings, wherein.

According to the invention in its preferred form, each of the landing paths for a plurality of landing strips is formed by the intersection of a pair of conically-shaped equi-signal surfaces of electromagnetic energy. Each of these conically shaped equi-signal surfaces is formed between a pair of conically-shaped radio beams emitted from cone-fire wave guide radiating systems constructed such that said beams are arranged in nested relation. The cone-fire wave guide radiators are supported substantially flush with the surface of a landing area and project beams upwardly from a point along the landing area which approximately coincides with the contact point at which approaching aircraft land on the runway.

Figure 1:
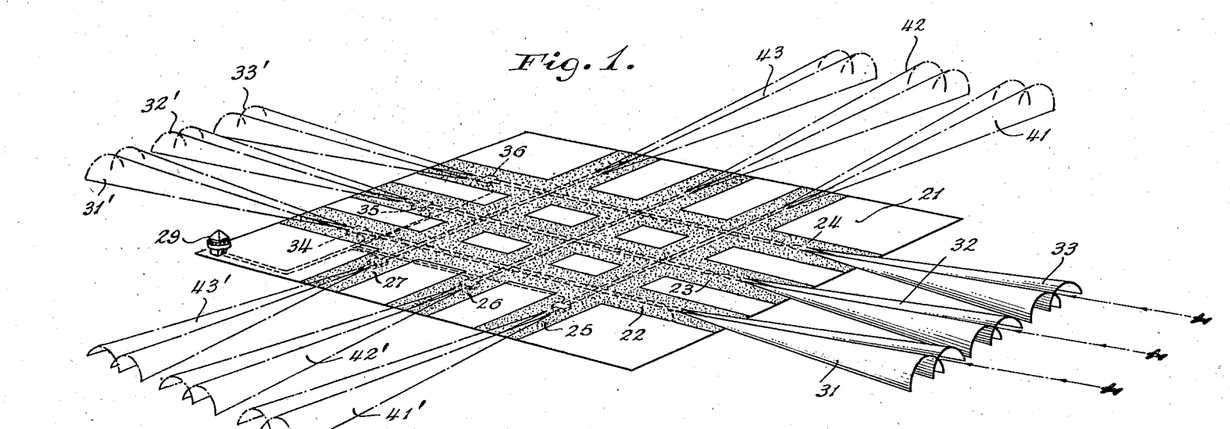
Fig. 1 is a perspective view of a landing field having a plurality of parallel runways extending in various directions and showing landing paths for each of said runways formed by the intersection of conically-shaped equi-signal surfaces.

Fig. 1 shows a landing area 21 as it may appear to an observer in an aircraft approaching to land thereon. This landing area is shown as having a set of three parallel runways 22, 23 and 24 extending in one direction and a second set of three parallel runways 25, 26 and 27 extending in a direction normal to the other set of runways. In order that landing paths may be formed for approaching each of the runways from either direction, a pair of radiating systems together with appropriate transmitting apparatus is provided for each end of each of the runways and may be controlled from a control tower 29.

As shown in Fig. 1, the runways 22, 23 and 24 are in use and are to be approached from the direction nearest to the observer. For this reason landing paths formed by pairs of conically-shaped equi-signal surfaces 31, 32 and 33 are shown in full line indicating that transmitters 34, 35 and 36 are connected to radiators at the end of the runways 22, 23 and 24 which are nearest to the observer.

Separate pairs of conically-shaped equi-signal surfaces 31', 32', and 33' may be directed from the opposite ends of runways 22, 23 and 24 by transmitters 34, 35 and 36 connected to radiators at said opposite ends of the respective runways. Similarly, pairs of conically-shaped equi-signal surfaces may be radiated from opposite ends of the runways 25, 26 and 27, as shown in dotted lines at 41, 41', 42, 42', 43 and 43', respectively, to form parallel landing paths for these runways when it is desired to land planes simultaneously on them.

Remote control systems may be operated from the control tower 29 to cause any of the desired radiating systems to function as will hereinafter be described in more detail.

Figures 2, 3, 4, 5:
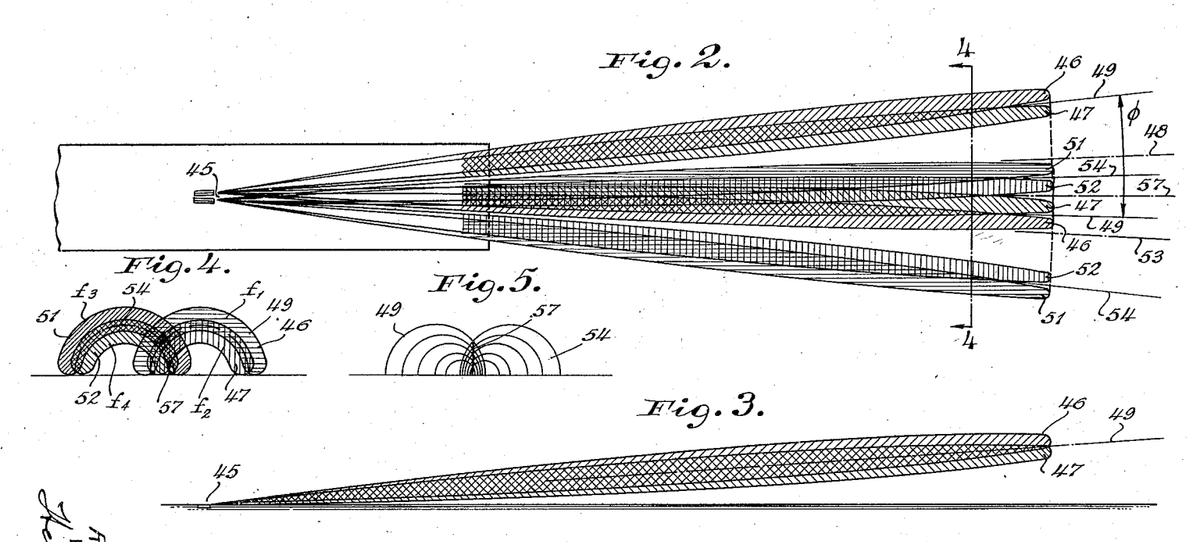
Fig. 2 is a plan view of one of the landing strips included in Fig. 1, showing a sectional representation of the various radio beams which are emitted by transmitting systems to form the two equi-signal surfaces that intersect to define the landing path.
Fig. 3 is a vertical section taken along the axis on one of the equi-signal surfaces shown in Fig. 2.
Fig. 4 is a sectional view of the radio beams taken along the line 4—4 of Fig. 2.
Fig. 5 is a rear elevation looking outwardly along the equi-signal surfaces shown in Fig. 2.

Each of the pairs of conically-shaped equi-signal surfaces 31, 32 and 33 is formed by four conically-shaped radio beams which are arranged in nested pairs, as shown in Fig. 2. The radiators are so arranged to emit the four beams from a comparatively small area which, for purposes of illustration, may be considered as contact point 45 at which aircraft land on the runway. One pair of conically-shaped beams 46 and 47 arranged in nested relation about an axis 48, are emitted from point 45 to form a first conically-shaped equi-signal surface 49 between the two beams. A second pair of conically-shaped radio beams 51 and 52 are emitted from the point 45 arranged in nested relation about an axis 53 to form a second conically-shaped equi-signal surface 54 between the two beams. The two conically-shaped equi-signal surfaces 49 and 54 intersect along a line 57 to define the landing path for the runway.

Each of equi-signal surfaces 49 and 54 is conically shaped and represents approximately one-half of a cone. Since the cone-fire radiators are arranged substantially flush with the ground, the lower half of each of the radiation patterns is reflected or absorbed. It will be apparent that the upper portion of each of the radio beams slopes upwardly away from contact point 45 as shown in Fig. 3 which is a vertical section of the radio beams 46 and 47, showing the equi-signal surface 49. As shown more clearly in Fig. 4, the conically-shaped radio beams are such that their maximum radiation is in the form of a cone and a minimum amount of energy is radiated along the axis of the cone. The beam 46, is radiated along the axis 48 (Fig. 2) and the beam 47 is radiated along substantially the same axis, but has an apex angle smaller than that of beam 46 so its maximum radiation cone fits within that of the beam 46. This nested relation of the two beams 46 and 47 provides an over-lapping portion that forms a conically-shaped equi-signal surface 49. In the same manner, the beams 51 and 52 are arranged in nested relation about substantially the same axis 53 to over-lap in a manner such that they form the equi-signal surface 54.

Figure 6:
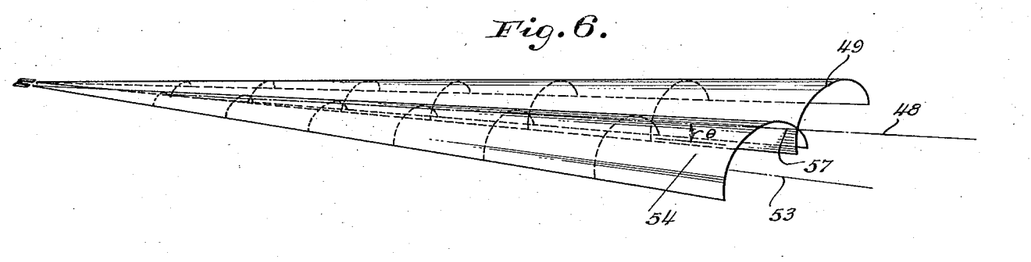
Fig. 6 is an enlarged perspective illustration of the conically-shaped equi-signal surface forming one of the landing paths shown in Fig. 1.

As shown in Figs. 5 and 6, the two conically-shaped equi-signal surfaces 49 and 54 are arranged to define a landing path 57 by their intersection. The apex angles of the radio beams are chosen to form an apex angle $\phi$ for the conically-shaped equi-signal surface that will intersect with a similar conically-shaped equi-signal surface to form a landing path inclined at any desired angle $\theta$ with respect to the surface of the landing area. The angle $\theta$ of the landing path may be any desired glide angle for approaching aircraft which is usually between 2 and 5 degrees.

In order that the intersection of the two conically-shaped equi-signal surfaces will be formed along portions of their surfaces which are inclined with respect to the surface of a landing area, the axis 48 and 53 of the two cones diverge toward opposite sides of the longitudinal direction of the runway and hence diverge from the landing path. Preferably, the angle of divergence is selected so the correct angle $\theta$ of the landing path will be produced when tangents to the two conically-shaped equi-signal surfaces 49 and 54 along the landing path 57 are disposed at angles of approximately 45° with respect to the surface of the landing area. The purpose of so arranging these equi-signal cones is to provide mutually perpendicular components for determining the displacement of an approaching aircraft from the desired landing path 57.

Figure 7:
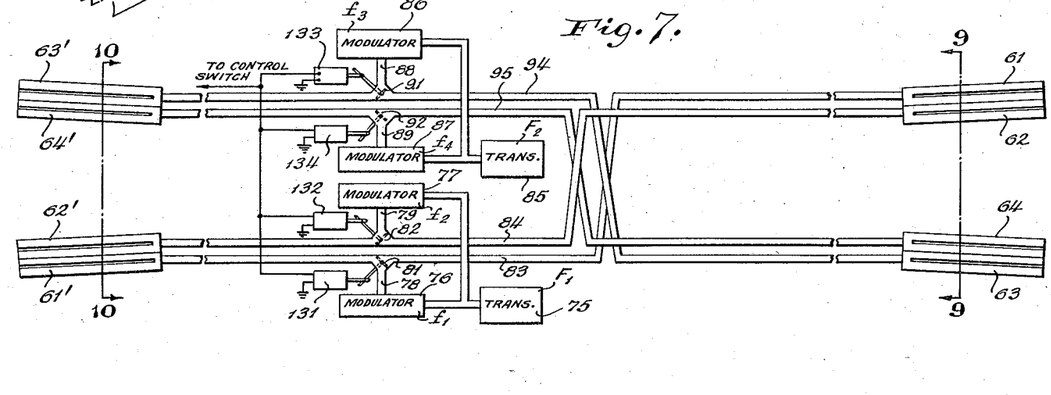
Fig. 7 is a schematic diagram of a preferred transmitting system showing one arrangement of the radiators for defining a landing path selectively from opposite ends of a runway.

Each end of each of the runways in the landing area is provided with a set of radiating wave guides. Each set of radiators consists of two radiating systems for producing the two conically-shaped equi-signal surfaces that form the landing path. As shown in Fig. 7, radiating wave guides 61 and 62 are arranged to emit a pair of conically shaped radio beams as, for example, beams 46 and 47 which form the equi-signal cone 49. Similarly, radiating wave guides 63 and 64 emit a second pair of conically-shaped radio beams such as the beams 51 and 52 to form an equi-signal cone 54.

The opposite end of the landing field may be provided with a landing path defined by radio beams emitted from wave guides 61', 62', 63' and 64' to form corresponding conically-shaped equi-signal surfaces when it is desired to have a landing plane approach from the opposite direction.

Figures 8, 9, 10, 11, 12:
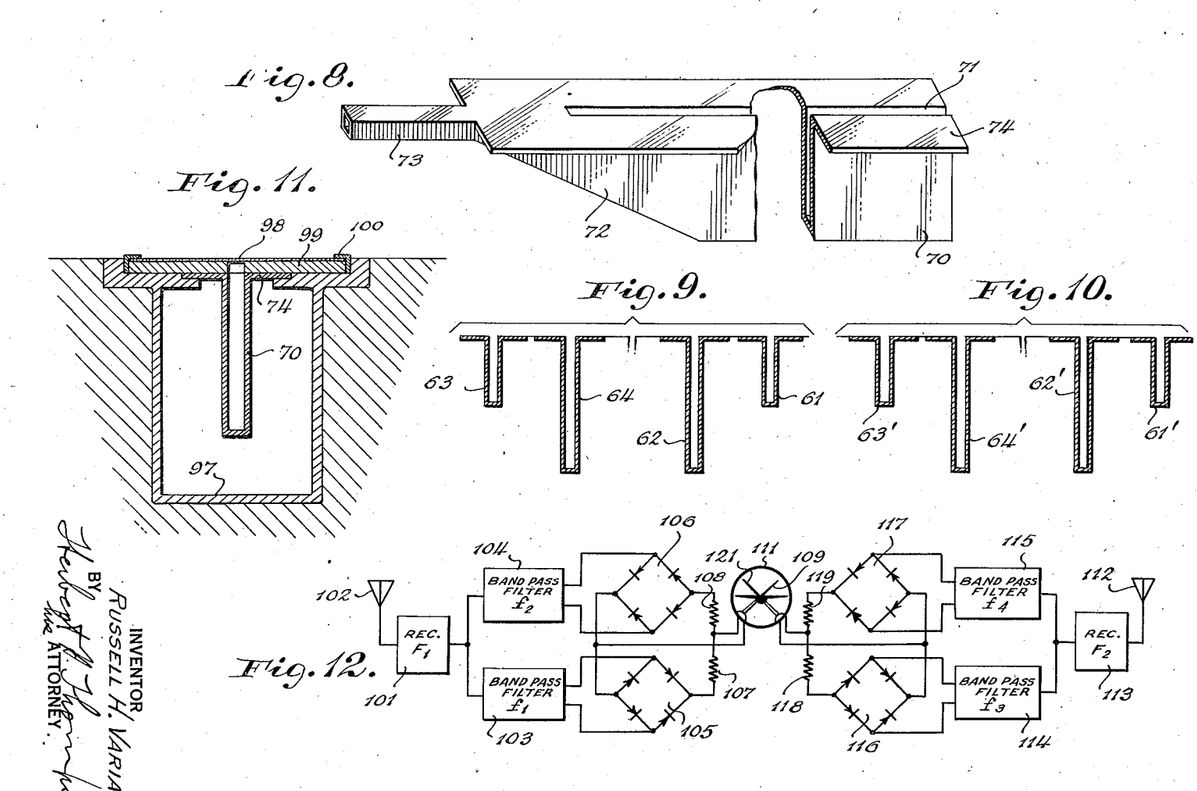
Fig. 8 is an enlarged perspective view of one of the radiating wave guides shown in Fig. 7 with portions broken away for the purposes of clearness.
Fig. 9 is a vertical section of the wave guide radiator taken on the line 9—9 of Fig. 7.
Fig. 10 is a vertical section of the wave guide radiators taken on the line 10—10 of Fig. 7.
Fig. 11 is a vertical section showing one arrangement for mounting a wave guide, such as shown in Fig. 8, substantially flush with the surface of the landing area.
Fig. 12 is a schematic diagram of receiver apparatus which may be used on an aircraft to follow a landing path defined according to the invention.

An enlarged view of one type of radiating wave guide which may be used in the present invention is shown in Fig. 8 in which a wave guide 70 having suitable horizontal and vertical dimensions is formed with a longitudinally extending radiating slot 71 having flanges 74 extending transversely thereof. A tapering throat portion 72 connects the radiating wave guide 70 to a conventional closed wave guide 73 for matching their impedances.

The type of wave guide shown in Fig. 8 emits a substantially conically-shaped radio beam symmetrically about an axis coincident with the longitudinal directional axis of the wave guide. When this wave guide is placed flush with the ground, the lower half of the beam is cut off to form a hemi-cone beam such as is shown in Fig. 2. This hemi-cone is not a complete surface of revolution since it consists of only one-half of a cone. However, it is conically shaped and the fraction of the complete cone depends upon the arrangement of the wave guide with respect to the ground. The apex angle of the conically-shaped radio beam depends upon the ratio of the phase velocity of wave energy along the wave guide 70 to the velocity of electromagnetic wave energy in space. The apex angle of the radiation pattern for such a wave guide is therefore a function of the phase velocity of wave energy along the guide.

Basically, the phase velocity along the guide depends upon the dimensions of the guide, the dielectric filling within the guide, and the wavelength of energy supplied to the guide. Any of these factors may be changed to change the phase velocity. For a more complete analysis of the effect of changes in the phase velocity on the formation of radiation patterns, reference may be had to copending application Serial No. 437,004, filed March 31, 1942, for Wave guide construction, in the names of Montgomery H. Johnson et al., now Patent 2,433,368, issued December 30, 1947.

In the form of the invention shown in Fig. 7, a transmitter 75 for generating radio frequency energy of a frequency $F_1$ corresponding to a selected wavelength, is connected to a pair of modulators 76 and 77 which modulate the frequency from the transmitter 75 by frequencies $f_1$ and $f_2$ which are preferably in the audio range. This high frequency energy $F_1$ modulated at two different audio frequencies $f_1$ and $f_2$ is supplied through wave guides 78 and 79 and high frequency switches 81 and 82 which direct the energy in a selected direction along wave guides 83 and 84, either to radiating wave guides 61 and 62, or radiating wave guides 61' and 62'.

As shown in Fig. 9 the radiating wave guides 61 and 62 have different vertical dimensions which causes a difference in the phase velocity of wave energy along the guides 61 and 62. This difference in phase velocity changes the apex angle of the conically-shaped beams radiated from the two wave guides.

The conically-shaped radio beam emitted by the wave guide 61 is modulated by audio frequency $f_1$ and corresponds to the outer conically-shaped radio beam 46 shown in Fig. 4. The radio beam emitted from the wave guide 62 has a smaller apex angle and is modulated by audio frequency $f_2$. This smaller beam corresponds to the inner beam 47 shown in Fig. 4.

In a similar manner transmitter 85 generates radio frequency energy $F_2$ corresponding to a second selected wavelength which is supplied by wave guides to modulators 86 and 87 which modulate the radio frequency energy $F_2$ to provide the audio frequencies $f_3$ and $f_4$. This modulated energy is supplied by wave guides 88 and 89 through high frequency switches 91 and 92 to a pair of wave guides 94 and 95 for selectively supplying the energy to radiating wave guides 63 and 64 or radiating wave guides 63' and 64'.

Although a pair of wave guide radiators is shown connected to each of the transmitters 75 and 85, individual transmitters may be connected to each of the wave guide radiators. Wave guides 63, 64, 63' and 64' are also constructed with different vertical dimensions as shown in Fig. 10 to provide different phase velocity for the selected wavelength for energy from the transmitter 85. This results in the wave guide 63 radiating a beam corresponding to that shown at 51 in Fig. 4 modulated by audio frequency $f_3$, whereas the wave guide 64 radiates a smaller conically-shaped radio beam corresponding to that shown at 52 in Fig. 4 and modulated at audio frequency $f_4$.

Although the wave guides are described as having different dimensions to produce the conically-shaped radio beams arranged in nested relation and having different apex angles, it will be apparent that the phase velocity may be adjusted by changing any other factor affecting it without departing from the scope of the invention. It is further contemplated that the conically-shaped radio beams having the same apex angle, may be arranged to radiate from different points along a substantially common axis to produce a conically-shaped equi-signal surface.

It will be noted that the wave guides 83, 84, 94 and 95 have cross-over sections for reversing the connections to the radiating wave guides at opposite ends of the runway. This provides identical arrangements of the beams for guiding an approaching aircraft along the landing path irrespective of the direction of its approach. Thus, the equi-signal surface defined by beams modulated by frequencies $f_1$ and $f_2$ appears on the starboard side of an approaching aircraft and beams $f_3$ and $f_4$ appear on the port side.

Fig. 11 shows one arrangement of supporting the radiating wave guides substantially flush with the ground in a manner to protect it from the weather and to permit aircraft to taxi over it without injury. As shown, the wave guide 70 is supported by its flanges 74 in a hollow conduit 97 and is protected by a cover 98 held in place on a supporting plate 99 by suitable clamp 100. The cover 98 may be formed of a thin sheet of any suitable dielectric material such as glass or polystyrene which will not materially affect the pattern of energy radiated by the wave guide.

One suitable receiver arrangement that may be used by an aircraft to follow the landing path described above, is shown diagrammatically in Fig. 12. A receiver 101, tuned to a frequency $F_1$ corresponding to the frequency of transmitter 75 detects energy collected by a suitable antenna 102, and supplies it simultaneously to a pair of band-pass filters 103 and 104 tuned respectively to audio frequency $f_1$ and $f_2$.

The output intensities of these band-pass filters are compared by a double bridge rectifier circuit consisting of rectifier bridges 105 and 106 and resistors 107 and 108. The double bridge circuit is connected to actuate one pointer 109 of a conventional cross-pointer indicator 111 in one direction or another depending upon whether more energy is passed by the band-pass filter 103 or the filter 104. The relative strengths of the energy from the band-pass filters 103 and 104, corresponding to the received radio energy modulated at frequency $f_1$ and $f_2$, respectively, provides a measure of the displacement of the antenna 102 with respect to the equi-signal surface 49 formed by the conically-shaped beams 47 and 48 that are modulated respectively by audio frequencies $f_1$ and $f_2$.

In a similar manner, another antenna 112 is connected to a receiver 113 which detects radio frequency energy of a frequency $F_2$ and supplies it simultaneously to band-pass filters 114 and 115 that are tuned to audio frequency $f_3$ and $f_4$. The outputs of the band-pass filters 114 and 115 are connected to a double bridge rectifier circuit including rectifier bridges 116 and 117 and resistors 118 and 119 that are connected to actuate pointer 121 of the cross-pointer indicator 111 according to the relative strengths of energy from the receiver 113, as modulated by frequencies $f_3$ and $f_4$, respectively. In this manner, the pointer 121 is deflected from its neutral position according to the displacement of the antenna 112 with respect to the conically-shaped equi-signal surface 54 formed between the two conically-shaped radio beams 51 and 52 which are modulated at frequency $f_3$ and $f_4$, respectively.

In operation, the air traffic control operator in the tower 29 operates remote control systems which may energize and/or deenergize solenoids 131, 132, 133 and 134 which control the position of high frequency switches 81, 82, 91 and 92, respectively, to direct high frequency energy from the transmitters 75 and 85 towards one end or the other of the runway. Similar switches are provided for all of the transmitting systems and may be controlled from the control tower 29. Thus, depending upon conditions at the landing area, the operator may direct planes to come in from any desired direction and control the operation of the radio systems to direct beams only in the desired direction. Obviously additional systems may be provided for diagonal runways as required.

Several planes may approach the landing area at the same time and simultaneously follow parallel landing paths such as the paths defined by equi-signal surfaces 31, 32 and 33 in Fig. 1 and follow these paths to the selected runways or landing strips 22, 23 and 24.

Each of the landing paths is defined by the intersection of two conically-shaped equi-signal surfaces. Each of these surfaces is, in turn, formed by a pair of conically-shaped radio beams arranged in nested relation to overlap and form conically-shaped equi-signal surfaces. The axes of the respective cones diverge with respect to the landing area and the apex angles of the cones are selected such that tangents to the conically-shaped equi-signal surfaces along their line of intersection form angles of substantially 45° with respect to the horizontal and hence are mutually perpendicular.

An aircraft approaching a particular landing path is provided with a pair of radio receivers tuned to detect radio energy from the two high frequency transmitters 75 and 85. This detected energy is supplied to a pair of band-pass filters which pass only frequencies corresponding to a particular modulation of one of the four radio beams from the landing path. The output of two band-pass filters corresponding to a pair of beams forming the equi-signal cone are combined and their difference in intensity is utilized to deflect one pointer of a cross pointer meter in one direction or another depending on which frequency is stronger. The other pointer of the cross-pointer meter is deflected in a similar manner according to the relative intensity of the second pair of frequencies received. Thus, the two pointers are deflected from their neutral position an amount corresponding to two component displacements of the aircraft with respect to the landing path in a manner such that the intersection of the pointer with respect to a reference point on the cross-pointer indicator provides an indication of the displacement of the aircraft with respect to the landing path.

As previously described, the equi-signal cones are formed by a pair of nested conically-shaped radio beams emitted from radiating wave guides that are connected to the same source of radio frequency energy; the phase velocities of waves along the guide being different to radiate conical beams having different apex angles. It will be apparent to those skilled in the art that, if desired, the same radiating wave guides or a pair of identical wave guides could be connected to sources of radio energy of different wavelengths to radiate a pair of conically-shaped radio beams for providing an equi-signal cone without departing from the scope of the invention.

Although the preferred embodiment of the invention, as described above, defines the landing path by the intersection of two equi-signal cones, a constant intensity type landing path may be defined by two conically-shaped radio beams. This may be accomplished by shutting off one of the radiators in each of the pairs, as shown in Fig. 7, to direct two conically-shaped radio beams intersecting along a line extending in the longitudinal direction of the runway. For example, radiators 61 and 63 may radiate beams 46 and 51. These beams intersect as shown in Figs. 2 and 4, in the same vertical plane with the intersection of the equi-signal surfaces. By flying a path along which the energy received from the two beams is constant and above the maximum radiation cones, an aircraft will gradually descend to the landing area.

As is well known in constant intensity landing systems, a cross-pointer indicator may be connected to a pair of receivers, the gain of which is adjusted so, for given intensities of received signals, the pointers of the indicator are deflected to coincide with a reference mark on the face of the indicator. As the strength or intensity of the received signals increases or decreases the respective pointers are moved away from the reference position to indicate that the aircraft has deviated from the constant-intensity landing path.

When an aircraft is approaching a landing area which defines a landing path by two conically-shaped radio beams, the gain of the receivers responding to the two conical beams may be adjusted in a conventional manner by setting the gain of the receivers at the time the craft passes over a marker beacon and is at a specific altitude. This altitude should be selected so the aircraft is above the intersection of the cones of maximum radiation and will therefore follow a constant intensity path that is higher than the intensities of the maximum radiation cones. The pilot then directs the craft to maintain the pointers at their reference position and in so doing keeps the craft at a position in space where the energy received from the two beams is constant. Since the energy radiated from the antennas is more concentrated near the antennas, the constant intensity path moves further from the cone of maximum radiation as the antenna is approached. This provides a curved landing path in which the craft makes an asymptotic approach to the landing area.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a landing system for a landing area, apparatus for defining a plurality of parallel landing paths, comprising a plurality of apertured wave guide radiating systems, each of said systems being arranged substantially flush with the surface of said landing area, and means for supplying radio frequency energy to said radiating systems for projecting beams of radio energy to form parallel landing paths to said landing area.

2. In a landing system for a landing area, apparatus for defining a plurality of landing paths, comprising a plurality of cone-fire apertured wave guide radiating systems, each of said systems being arranged substantially flush with the surface of said landing area, and means for supplying radio frequency energy to said radiating systems for projecting a plurality of pairs of conically shaped radio beams arranged in nested relation to form a plurality of conically-shaped equi-signal surfaces intersecting to form a plurality of parallel landing paths to said landing area.

3. In a landing system for a landing area, apparatus defining a plurality of parallel landing paths comprising a plurality of cone-fire apertured wave guide radiating systems arranged substantially flush with the surface of said landing area, and means for supplying radio frequency energy to said radiating systems for projecting a plurality of conically-shaped radio beams, said radiating systems being constructed and arranged in pairs having divergent axes such that said conically-shaped beams are arranged in pairs intersecting to form a plurality of landing paths projecting upwardly from said landing area.

4. In a landing system for a landing area, apparatus defining a plurality of parallel landing paths comprising a plurality of cone-fire wave guide radiating systems, each of said systems being terminated by an apertured wave guide arranged substantially flush with the surface of said landing area, and means for supplying radio frequency energy to said radiating systems for projecting a plurality of pairs of conically-shaped radio beams arranged in nested relation from each of said systems to form a plurality of conically-shaped equi-signal surfaces, said radiating systems being constructed and arranged in pairs having divergent axes such that said conically-shaped equi-signal surfaces are arranged in pairs intersecting to form a plurality of landing paths projecting upwardly from said landing area.

5. In a landing system for a landing area having a plurality of parallel landing strips, apparatus for defining a landing path to each of said landing strips comprising a wave guide radiating system for each end of each of said strips, each of said systems being terminated by an apertured waveguide supported substantially flush with the surface of said landing area, and means for supplying radio frequency energy to each of said radiating systems, said radiating systems being arranged to radiate beams of energy from each end of each of said landing strips intersecting to form landing paths for approaching said landing strips from opposite directions.

6. In a landing system for a landing area having a plurality of parallel landing strips, apparatus for defining a landing path to each of said landing strips comprising a wave guide radiating system for each end of each of said strips, each of said systems being terminated by an apertured wave guide supported substantially flush with the surface of said landing area, means for supplying radio frequency energy to each of said radiating systems, said radiating systems being arranged to radiate a pair of equi-signal surfaces from each end of each of said landing strips intersecting to form landing paths for approaching said landing strips from opposite directions, and switching means for selectively connecting said means to supply radio frequency energy to the radiating systems at a selected end of said landing strips.

7. In a radio landing system, apparatus for defining a landing path comprising a pair of radiating systems having dissimilar phase velocity characteristics emitting intersecting hollow conically-shaped radio beams having axes of revolution substantially parallel to ground to form a landing path, and means for supplying radio frequency energy to said radiating systems.

8. In a radio landing system, apparatus for defining a landing path comprising a pair of radiating systems of differing transverse configuration emitting an intersecting pair of hollow conically-shaped equi-signal surfaces having axes of revolution substantially parallel to ground to form a landing path, and means for supplying radio frequency energy to said radiating systems.

9. In a radio landing system, apparatus for defining a landing path comprising means for generating radio frequency energy, a first cone-fire radiating system having components of radiation of dissimilar transverse characteristics connected to said means for emitting a hollow conically-shaped radio beam having an axis of symmetry substantially parallel to ground, and a second cone-fire radiating system similar to said first radiating system connected to said means for emitting a hollow conically-shaped radio beam having an axis of symmetry substantially parallel to ground, intersecting said first hollow conically-shaped beam to form a landing path.

10. In a radio landing system, apparatus for defining a landing path comprising means for generating radio frequency energy, a first cone-fire radiating system having radiation components of dissimilar transverse configuration connected to said means for emitting a pair of hollow, concave-downward, conically-shaped radio beams arranged in nested relation to form a first conically-shaped equi-signal surface between said beams, and a second cone-fire radiating system having radiation components of dissimilar transverse configuration connected to said means for emitting a pair of hollow, concave-downward, conically-shaped radio beams arranged in nested relation to form a second conically-shaped equi-signal surface therebetween, and said latter surface intersecting said first conically-shaped equi-signal surface to form a landing path.

11. In a radio landing system, apparatus for defining a landing path comprising a first transmitter for generating radio frequency energy, a first radiating system having radiation components of dissimilar transverse configuration connected to said first transmitter for emitting a pair of hollow, concave-downward, conically-shaped radio beams, arranged in nested relation, to form a first conically-shaped equi-signal surface between said beams, a second transmitter for generating radio frequency energy, and a second radiating system having radiation components of dissimilar transverse configuration connected to said second transmitter for emitting a pair of hollow, concave-downward, conically-shaped radio beams arranged in nested relation to form a second conically-shaped equi-signal surface between said beams, and said latter surface intersecting said first equi-signal surface to form a landing path.

12. In a radio landing system, apparatus for defining a landing path comprising a first transmitter for generating radio frequency energy, a pair of cone-fire radiators having components of dissimilar transverse configuration connected to said transmitter, each of said radiators emitting a hollow, downwardly concave conically-shaped radio beam arranged in nested relation with respect to the hollow, downwardly concave conically-shaped radio beam of the other of said radiators to form a first conically-shaped equi-signal surface, a second transmitter for generating radio frequency energy, and a second pair of cone-fire radiators having components of dissimilar transverse configuration connected to said second transmitter, each of said last-named radiators being constructed to emit a hollow, downwardly concave conically-shaped radio beam arranged in nested relation with respect to the hollow, downwardly concave conically-shaped radio beam emitted by the other of said last-named radiators to form a second conically-shaped equi-signal surface, said pairs of cone-fire radiators being constructed and arranged in a manner such that said conically-shaped equi-signal surface intersects to form a landing path.

13. In a radio landing system, apparatus for defining a landing path comprising a pair of wave guide radiating systems having dissimilar transverse characteristics for producing a pair of hollow, downwardly concave radio beams intersecting to form a landing path, and means for supplying radio frequency energy to said radiating systems.

14. In a radio landing system, apparatus for defining a landing path comprising a pair of wave guide radiating systems having dissimilar transverse characteristics for producing a pair of conical equi-signal surfaces intersecting to form a landing path, and means for supplying radio frequency energy to said radiating systems.

15. In a radio landing system, apparatus for defining a landing path, comprising means for generating radio frequency energy, a first cone-fire wave guide radiating system having components of dissimilar phase velocity characteristics connected to said means for emitting a hollow-downwardly concave conically-shaped radio beam arranged to form a first equi-signal surface, a second cone-fire wave guide radiating system having components of dissimilar phase velocity characteristics connected to said means for emitting a second hollow, downwardly concave conically-shaped beam arranged to intersect said first conical beam to form a landing path extending upwardly from said radiating systems.

16. In a radio landing system, apparatus for defining a landing path, comprising means for generating radio frequency energy, a first wave guide radiating system having components of dissimilar phase velocity characteristics connected to said means for emitting a pair of radio beams arranged to form a first equi-signal surface, a second wave guide radiating system having components of dissimilar phase velocity characteristics connected to said means for emitting a second pair of radio beams arranged to form a second equi-signal surface intersecting said first equi-signal surface to form a landing path extending upwardly from said radiating systems.

17. In a radio landing system, apparatus for defining a landing path, comprising means for generating radio frequency energy of a selected wavelength, a first pair of cone-fire radiating wave guides constructed to provide different phase velocities for energy of said wavelength connected to said wave guides for emitting a pair of nested conically-shaped radio beams to form a first conically-shaped equi-signal surface, means for generating radio frequency energy of a second selected wavelength, and a pair of cone-fire radiating wave guides constructed to provide different phase velocities for said selected wavelengths connected to said wave guides for emitting a pair of conically-shaped radio beams to form a second conically-shaped equi-signal surface, said cone-fire radiating wave guides being arranged in a manner such that said equi-signal surfaces intersect to form a landing path.

18. In a landing system for a landing area, apparatus for defining a landing path comprising a first antenna system arranged substantially flush with the surface of said landing area for radiating a curved beam of electromagnetic energy at an angle with said area substantially of the same order of magnitude as the angle of said landing path and curving upwardly from said landing area in one direction and extending in the general longitudinal direction of a runway, and a second similarly constructed antenna system for radiating a curved beam of electromagnetic energy at the aforesaid angle curving upwardly toward said first beam in the opposite direction thereto and extending in the general longitudinal direction of said runway, said antenna systems being arranged in a manner such that the intersection of said beams forms a landing path projecting upwardly from and in the longitudinal direction of said runway.

19. In a landing system for a landing area, apparatus for defining a landing path comprising a first antenna system arranged substantially flush with said landing area radiating a nested pair of curved beams of electromagnetic energy arranged at an angle substantially of the same order of magnitude as the angle of said landing path to form a first equi-signal surface curving upwardly from a landing area in one direction and extending in the general longitudinal direction of a runway, and a second antenna system similarly constructed radiating a nested pair of curved beams of electromagnetic energy at the aforesaid angle to form a second equi-signal surface curving upwardly toward said first equi-signal surface in the opposite direction thereto and extending in the general longitudinal direction of said runway, said antenna systems being arranged in a manner such that the intersection of said equi-signal surfaces forms a landing path projecting upwardly from and in the longitudinal direction of said runway.

20. In a landing system for a landing area, apparatus for defining a landing path comprising a first antenna system arranged substantially flush with said landing area radiating a nested pair of hollow conically-shaped beams of electromagnetic energy about an axis of revolution substantially parallel to the landing area to form a first conically-shaped equi-signal surface about said axis and extending in the general longitudinal direction of a runway, and a second antenna system similarly constructed radiating a nested pair of hollow conically-shaped beams of electromagnetic energy about another axis of revolution substantially parallel to said landing area to form a second conically-shaped equi-signal surface about said other axis and extending in the general longitudinal direction of said runway, said antenna systems being arranged in a manner such that said axes diverge and said conically-shaped equi-signal surfaces intersect in a line to form a landing path projecting upwardly from and in the longitudinal direction of said runway.

21. In a landing system for a landing area, apparatus for defining a landing path comprising a first antenna system arranged substantially flush with said landing area for radiating a nested pair of beams of electromagnetic energy about one axis to form a first equi-signal surface curved symmetrically about said axis substantially parallel to said landing area and extending in the general longitudinal direction of a runway and a second antenna system for radiating another pair of beams of electromagnetic energy arranged about another axis to form an equi-signal surface curved symmetrically about said other axis substantially parallel to said landing area and extending in the general longitudinal direction of said runway, said antenna systems being arranged in a manner such that the intersection of said equi-signal surfaces forms a landing path projecting upwardly from and in the longitudinal direction of said runway.

22. In a landing system for a landing area, apparatus for defining a landing path comprising a first antenna system having radiator components of dissimilar phase velocity characteristics for producing a hollow conically-shaped radio beam having its axis extending parallel to and in the general longitudinal direction of a runway, but diverging therefrom, and a second antenna system having radiator components of dissimilar phase velocity characteristics for producing a second hollow conically-shaped radio beam having its axis extending parallel to and in the general longitudinal direction of said runway, but diverging from said runway in a direction opposite to the axis of said first beam, said antenna systems being arranged in a manner such that said radio beams intersect to form a landing path projecting upwardly from and in the longitudinal direction of said runway.

23. In a landing system, apparatus for defining a landing path comprising a first antenna system having radiator components of dissimilar phase velocity characteristics for producing a conically-shaped equi-signal surface having its axis extending substantially parallel to and in the general longitudinal direction of a runway, but diverging therefrom, and a second antenna system having radiator components of dissimilar phase velocity characteristics for producing a second conically-shaped equi-signal surface having its axis extending substantially parallel to and in the general longitudinal direction of said runway, but diverging from said runway in a direction opposite to the axis of said first equi-signal surface, said antenna systems being arranged in a manner such that said equi-signal surfaces intersect to form a landing path projecting upwardly from and in the longitudinal direction of said runway.

24. In a landing system, apparatus for defining a landing path comprising a first antenna system having radiator components of dissimilar phase velocity characteristics for producing an equi-signal surface of electromagnetic energy curving upwardly from one side of and over the longitudinal direction of a runway at an angle substantially of the same order of magnitude as the angle of said landing path, and a second antenna system having radiator components of dissimilar phase velocity characteristics for radiating a second equi-signal surface of electromagnetic energy curving upwardly from the opposite side of and over the longitudinal direction of said runway at an angle substantially of the same order of magnitude as the angle of said landing path, said antenna systems being arranged in a manner such that said curved equi-signal surfaces intersect in a line projecting upwardly from said runway and in the longitudinal direction thereof.

25. In a landing system, apparatus for defining a landing path comprising a first antenna system having radiation components of dissimilar phase velocity characteristics for producing an equi-signal surface of electromagnetic energy curving upwardly from one side of the longitudinal direction of a ruway symmetrically about an axis diverging from the opposite side of the longitudinal direction of said runway at an angle substantially of the same order of magnitude as the angle of said landing path, and a second antenna system similarly constructed for producing an equi-signal surface of electromagnetic energy curving upwardly at an angle similar to the aforesaid angle from said opposite side of the longitudinal direction of said runway symmetrically about an axis diverging from said one side of the longitudinal direction of said runway, said antenna systems being arranged in a manner such that the intersection of said equi-signal surfaces forms a landing path projecting upwardly from and in the longitudinal direction of said runway.

26. Radio apparatus for defining a conically-shaped equi-signal surface comprising a source of radio frequency energy of a selected wavelength, a pair of cone-fire radiators having dissimilar phase velocity characteristics connected to said source emitting a nested pair of hollow, downwardly-concave conically-shaped radio beams to form a conically-shaped equi-signal surface between said beams.

27. Radio apparatus for defining a conically-shaped equi-signal surface comprising a source of radio frequency energy of a selected wavelength, a first cone-fire radiating wave guide constructed to provide a certain phase velocity for energy of said selected wavelength connected to said source for emitting a first hollow conically-shaped radio beam having an axis of revolution substantially parallel to ground and a second cone-fire radiating wave guide constructed to provide a different phase velocity for energy of said selected frequency connected to said source for emitting a second hollow conically-shaped radio beam having an axis of revolution substantially parallel to ground arranged in nested relation to said first radio beam to form a conically-shaped equi-signal surface between said beams.

28. In a radio landing system for a landing area, apparatus comprising means for generating radio frequency energy, means coupling said generating means to a plurality of cone-fire radiators arranged substantially flush with the surface of said landing area, said radiators being terminated by elongated apertured wave guides having dissimilar phase velocities for producing intersecting conical equi-signal surfaces in space to define a landing path for approaching said landing area.

29. In a radio landing system for a landing area, apparatus comprising means for generating radio frequency energy, means coupling said generating means to two pairs of apertured wave guide radiators arranged substantially flush with the surface of said landing area, each wave guide of a guide pair having a transverse configuration differing from the other guide of said same guide pair, to radiate nested pairs of hemi-conically shaped radio beams, said beams having conical equi-signal surfaces residing therebetween, and having an angle with said landing area in the same order of magnitude as the landing angle of the landing path formed by the intersection of a pair of said equi-signal surfaces.

30. In a radio landing system for a landing area, apparatus comprising means for generating radio frequency energy, means coupling said generating means to two pairs of apertured wave guide radiators arranged substantially flush with the surface of said landing area, each wave guide of a guide pair having dissimilar phase velocity characteristics differing from the other guide of said same guide pair, to radiate nested pairs of hemi-conically shaped radio beams, said beams having conical equi-signal surfaces residing therebetween, and having an angle with said landing area in the same order of magnitude as the landing angle of the landing path formed by the intersection of a pair of said equi-signal surfaces.

31. In a radio landing system for a landing area, apparatus comprising means for generating radio frequency energy, means coupling said generating means to a plurality of wave guide radiators arranged substantially flush with the surface of said landing area, said radiators having dissimilar phase velocity characteristics and radiating substantially conically-shaped radio beams into space about an axis coincident with the longitudinal axis of said wave guides, said beams intersecting to define a landing path for approaching said landing area.

32. In a system for landing an aircraft, the method which comprises forming a pair of intersecting conical equi-signal surfaces and directing said aircraft vertically and horizontally along a landing path determined by the intersection of said surfaces.

33. In a system for landing an aircraft, the method which comprises forming a plurality of directive radio beams substantially in the shape of hollow cones having apexes substantially on the ground, placing the beams in nested relation to produce equi-signal conical surfaces therebetween, intersecting said surfaces and directing said aircraft transverse to said landing area along a landing path determined by the intersection of said equi-signal surfaces.

34. In a system for landing an aircraft, the method which comprises forming a plurality of directive radio beams substantially in the shape of hollow hemi-cones, placing said beams in nested relation to produce equi-signal conical surfaces therebetween, intersecting said equi-signal surfaces and directing said aircraft transversely to a landing area along a landing path determined by the intersection of said surfaces.

35. In a system for landing an aircraft, the method which comprises forming a plurality of directive radio beams substantially in the shape of hollow hemi-cones, said cones being convexed upward, placing said beams in nested relation to produce equi-signal surfaces therebetween, intersecting said equi-signal surfaces and directing said aircraft vertically and horizontally along a landing path determined by the intersection of said equi-signal surfaces.

36. In a system for landing an aircraft, the method which comprises forming a plurality of directive radio beams substantially in the shape of hollow conical sections, said sections being concaved downwards, placing said beams in nested relation to produce equi-signal surfaces therebetween, intersecting said equi-signal surfaces and directing said aircraft transversely to a landing area along a landing path determined by the intersection of said surfaces.

37. In a system for landing an aircraft, the method which comprises forming a plurality of directive radio beams substantially in the shape of hollow cones having apexes substantially on the ground, placing said beams in nested relation to produce equi-signal surfaces therebetween, intersecting said equi-signal surfaces, and directing said aircraft vertically and horizontally along a landing path formed thereby and having a landing angle substantially of the same order of magnitude as the apex angle of said conical beams.

38. In a system for landing an aircraft in a landing area, the method which comprises forming a plurality of directive radio beams substantially in the shape of hollow cones having axes of revolution substantially parallel to said landing area, placing said beams in nested relation to produce equi-signal surfaces therebetween, intersecting said equi-signal surfaces and directing said aircraft vertically and horizontally along a landing path determined by the intersection of said surfaces.

39. In a system for landing an aircraft in a landing area, the method which comprises forming a plurality of directive radio beams substantially in the shape of hollow cones having axes of revolution substantially parallel to said landing area, placing said beams in nested relation to produce equi-signal surfaces therebetween, intersecting said equi-signal surfaces and directing said aircraft transversely to a landing area along a landing path formed thereby and having a landing angle substantially of the same order of magnitude as the apex angle of said conical beams.

RUSSELL H. VARIAN.

REFERENCES CITED

The following references are of record in the file of this patent:

UNITED STATES PATENTS

| Number | Name | Date |
|---|---|---|
| 2,120,241 | Diamond et al. | June 14, 1938 |
| 2,165,256 | Hansell | July 11, 1939 |
| 2,294,882 | Alford | Sept. 8, 1942 |